UNITED STATES PATENT OFFICE.

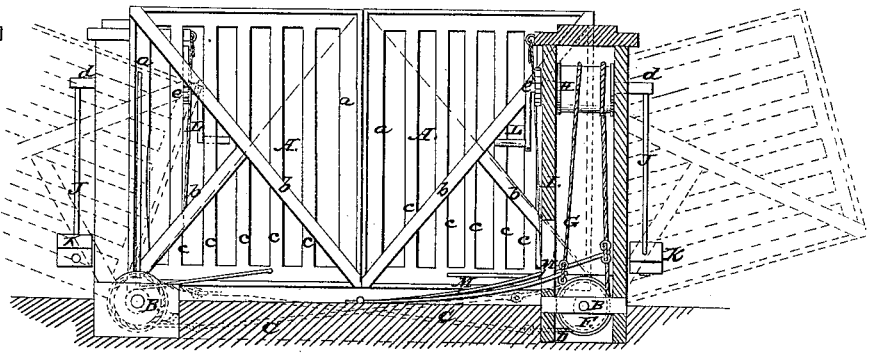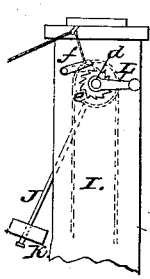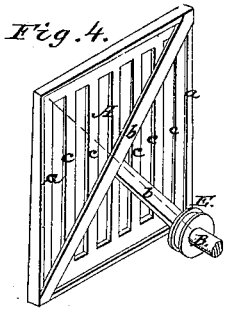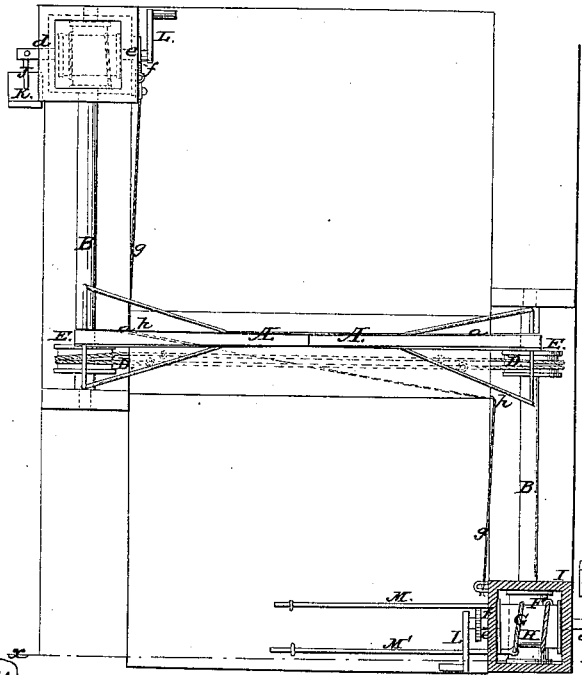

NATHANIEL WATERBURY, OF FOND DU LAC, WISCONSIN.

GATE.

Specification of Letters Patent No. 26,063, dated November 8, 1859.

*To all whom it may concern:*

Be it known that I, N. WATERBURY, of Fond du Lac, in the county of Fond du Lac and State of Wisconsin, have invented certain new and useful Improvements in Gates; and I do hereby declare that the following is a full, clear, and exact description of the same, reference being had to the annexed drawings, making a part of this specification, in which—

Figure 1, is a front view of my invention,—one of the posts and the foundation being bisected as indicated by the line $x$, $x$, Fig. 2. Fig. 2, is a plan or top view of ditto. Fig. 3, is a detached side view of one of the posts. Fig. 4, is a detached perspective view of one of the gates of ditto.

Similar letters of reference indicate corresponding parts in the several figures.

This invention relates to that description of gates which have mechanism connected to them capable of being actuated automatically by the passing along of a vehicle or manually by a person within the same or on horse back, for the purpose of opening and closing the gates.

The invention consists in a novel way of constructing the gate and in the arrangement of mechanism connected therewith substantially as hereinafter described, whereby a very simple and efficient operating mechanism is obtained for the intended purpose.

To enable those skilled in the art to fully understand and construct my invention I will proceed to describe it.

The gate is constructed of two equal parts A, A. Each part A, is attached at its outermost lower end to a shaft B, and the two shafts B, B, are connected by cross rods C, C, and cords D, D, the latter being attached to and passing around pulleys E, on the shafts. These rods and cords form an arbitrary connection between the two shafts and insure a simultaneous movement of the two shafts in opposite directions when either of them is turned. The rods and cords may be fitted in a box or chest below the gate and the shafts B, B, may be if necessary protected by a suitable covering.

The parts A, A, of the gate are formed of rectangular frames $a$, braced and strengthened by diagonal bars $b$, and filled in with vertical slats $c$, or slats arranged in any way to serve as a barrier and give strength to the gate. The two parts A, A, of the gate are not of the same dimensions throughout they gradually decrease in weight diagonally from their lower to their upper ends as indicated by the red dotted lines in Figs. 1 and 4. This diminution in weight is effected by making the parts gradually lighter. This will be clearly understood by referring to Fig. 4. The two parts A, A, are in the same plane and it will at once be seen that by turning either shaft B, the gate may be opened and closed, the parts A, A, when the gate is open being turned outward from each other as shown in red Fig. 1, and when turned so as to be brought in contact as shown in black they are of course closed.

The object in constructing the parts A, A, so as to decrease in weight diagonally as shown, is to facilitate the turning of the same, the opposing force of gravity being thereby correspondingly diminished.

On the outer part of each shaft B, a pulley F, is placed. Around each pulley F, a rope or chain G, passes, said ropes or chains also extending over pulleys H, in the upper parts of hollow posts or trunks I. The axes $d$, of the pulleys H, extend through the posts or trunks I, and to the outer end of each axis $d'$, a pendent rod J, is attached each rod being provided with an adjustable weight K. To the inner end of each axis $d$, a crank L, is attached and a ratchet $e$, is placed on each axis adjoining its crank, a pawl $f$, engaging with each ratchet, see Fig. 3, and the two pawls are connected by a cord $g$, which passes through eyes or guides $h$, and through the box or chest in which the rods C, are placed.

From the above description it will be seen that either crank L, may be turned by a person from a carriage or on horse back and the gate opened and closed. The weights K, serve as counterpoises and their effect may be graduated as desired by adjusting them higher or lower on their rods J. It will of course be understood that the pawls $f$, must be disengaged from the ratchets $e$, previous to turning the cranks L.

In case it is desired to have the gate operated automatically, that is to say, by the vehicle in passing along, rods M, M', may be attached to the ropes or chains G, two to each side of each pulley F, as shown in Figs. 1 and 2, so that the weight of the vehicle as the wheels pass over the rods M, M', will actuate said ropes or chains, the rods M, opening the gate and the rods M', closing it, the rods M, M', being at such a distance apart that all of the wheels of a vehicle will pass over one rod of a pair before reaching its fellow.

By having the parts A, A, of the gate arranged to open and close as described they are not liable to be obstructed by snow or ice. They also may be actuated by a small expenditure of power.

The rod J, and weight K, it will be observed constitute a pendulum, swinging at right angles to the axis and movement of the gate. By this arrangement the gate may be turned entirely down level with the ground. But by the common mode of counterpoising, viz., the attachment of a weight to a lever extending from the rear part of the gate it cannot be turned down level; and besides the levers present an obstruction by their lateral projection.

I do not claim broadly the hanging of the gate so as to turn upon an axis at its heel; nor do I claim broadly the counterpoising of the weight of the gate. But

Having thus described my invention I claim as new and desire to secure by Letters Patent,

The arrangement and combination of the pendulous rod J, and weight K, with the axis of the pulley H, as and for the purpose herein shown and described.

NATHANIEL WATERBURY.

Witnesses:
R. SPENCER,
J. W. COOMBS.